United States Patent [19]
Shima et al.

[11] Patent Number: 5,484,058
[45] Date of Patent: Jan. 16, 1996

[54] TAPE CASSETTE STORAGE CONTAINER WITH PRESSING PROJECTIONS

[75] Inventors: Motohiko Shima; Masatoshi Okamura, both of Saku; Jin Kutsukake, Ueda, all of Japan

[73] Assignee: TDK Corporation, Tokyo, Japan

[21] Appl. No.: 297,856

[22] Filed: Aug. 30, 1994

[30] Foreign Application Priority Data

Sep. 10, 1993 [JP] Japan ................. 5-054153 U
Oct. 21, 1993 [JP] Japan ................. 5-061814 U

[51] Int. Cl.$^6$ ................................ B65D 85/67
[52] U.S. Cl. ................. 206/387.1; 206/387.13; 206/493
[58] Field of Search ............. 206/387.1, 387.13, 206/493

[56] References Cited

U.S. PATENT DOCUMENTS

| | | | |
|---|---|---|---|
| 3,876,071 | 4/1975 | Neal et al. | 206/387.13 X |
| 4,011,940 | 3/1977 | Neal et al. | 206/387.13 X |
| 4,054,206 | 10/1977 | Kobayashi et al. | 206/387.13 X |
| 4,184,594 | 1/1980 | Hehn . | |
| 4,231,474 | 11/1980 | Takahashi | 206/387.13 |
| 4,365,711 | 12/1982 | Long et al. . | |
| 4,428,481 | 1/1984 | Basili . | |
| 4,871,064 | 10/1989 | Hehn et al. | 206/387.1 |

FOREIGN PATENT DOCUMENTS

| | | |
|---|---|---|
| 4-106286 | 9/1992 | Japan . |
| 4-106285 | 9/1992 | Japan . |
| 2105306 | 3/2383 | United Kingdom . |

*Primary Examiner*—Bryon P. Gehman
*Attorney, Agent, or Firm*—Oblon, Spivak, McClelland, Maier, & Neustadt

[57] ABSTRACT

A tape cassette storage container comprising
a main body and an upper-lid, which are adapted to store a tape cassette including a pair of reels with a tape wound thereon, and pressing members urging the reels in a casing of combined upper and lower halves, the pressing members having top ends exposed outside from through holes formed in a window in an upper plate of the casing;
wherein the upper lid includes a top plate which has an inner surface formed with pressing projections to urge the pressing members on closure; the pressing projections are made of inner thin-wall cylindrical projections; the top plate of the upper lid has the inner surface formed with outer thick-wall cylindrical projections to be around and close to the inner cylindrical projections; and the outer cylindrical projections have a shorter projection length than the inner cylindrical projections in such a manner to be out of contact with the window of the cassette casing.

4 Claims, 7 Drawing Sheets

TAPE CASSETTE STORAGE CONTAINER WITH PRESSING PROJECTIONS

The present invention relates to a container for storing a tape cassette wherein pressing members housed in a casing have upper ends exposed outside from through holes formed in an upper half.

For the past, video tape cassettes which are shown in FIG. 14 have been used for business purpose such as broadcasting. In the Figure, reference numeral 10 designates a video tape cassette as whole, reference numeral 12 designates a cassette casing which is constituted by combining upper and lower halves 14 and 16, and reference numeral 18 designates a front lid. In place inside the cassette casing 12 are housed a supply (right side) reel 20 and a take-up (left side) reel 22 which have a magnetic tape (not shown) wound thereon. The upper half 14 has an upper plate 24 provided with an elongated transparent window 26 in a central portion of the upper plate and close to a rear plate to extend in the right-to-left direction. The lower half 16 has a bottom plate formed with drive shaft inserting holes which are used to transmit drive force to hubs 28 and 30 of the reels 20 and 22. The front lid 18 is constituted by a front lid section and an inner lid section, and is spring-loaded to close a front opening of the tape cassette 10 in non-use of the tape cassette 10 and to cover the opposite surfaces of the magnetic tape extending across the front opening for protection. Such an arrangement can prevent dirt and dust from entering through the front opening from outside, and a user or a carrier from inadvertently getting in touch with the magnetic tape on handling. An adhesion of dirt and dust etc. on the magnetic tape, or damage to it can cause an error in a signal to disturb an image, contributing dropout.

The drive shaft inserting holes which are formed in the bottom plate of the lower half 16 are closed by the corresponding reels 20 and 22. However, this arrangement can not close the drive shaft inserting holes in a good manner. In order to cope with this problem, pressing members 32 and 34 which comprise spring-loaded buttons lie on the hubs 28 and 30 to urge the reels 20 and 22 against the bottom plate of the lower half 16 in non-use of the tape cassette. In use of the tape cassette 10 (when it is placed in a tape deck), those pressing members 32 and 34 press down the reels 20 and 22 which are urged upwardly, stabilizing tape travel. The reel buttons have flanges on top thereof exposed outside from through holes 36 and 38 formed in the transparent window 26 of the upper half 24.

Such a tape cassette 10 is held in a storage container for storage or shipment, which is normally constituted by a main body with a 1 rocking mechanism, and a top lid. In the storage container, the reels 20 and 22 in a non-use tape cassette 10 are merely urged against the bottom plate of the lower halves 16 by the corresponding pressing members 32 and 34. As a result, application of vibration to the container during shipment allows the reels 20 and 22 to jar in the casing 12 and to collide with e.g. inner surfaces of the upper and lower halves 14 and 16 or a component projecting therefrom, thereby being liable to produce shaved or scraped powder. Even if dirt and dust can be prevented from entering from outside in an effective manner, such powder which are produced inside can cause an error in a signal, and the tape deck can have the head clogged at the worst. Although the cassette casing 12 includes a reel brake (not shown) therein, the reel brake is for preventing the tape from unwinding. The reel brake can prevent the reels 20 an 22 from rotating in a reverse rotational direction, but can not be effective against rotation in the other direction. The reel brake can not prevent the reels from jarring in that direction.

In order to prevent the powder from causing due to reel jars, there has been proposed in Japanese Utility Model Application No. 16118/1991 a tape cassette storage container 40 which is constituted by a main body 42 and an upper lid 44, and a top plate 46 of the upper lid 44 has a central portion on an inner surface thereof formed with cylindrical pressing projections 48 and 50 to urge the pressing members 32 and 34 of the reels 20 and 22 of the tape cassette 10 housed on closure, which is shown in FIG. 12 (plan view) and in FIG. 13 (left side view). When such a storage container 40 is used to downwardly urge the reel pressing members 32 and 34 of the housed tape cassette 10 by the cylindrical projections 48 and 50 formed on the inner surface of the top plate 46 of the upper lid 44, ring-shaped end surfaces of the cylindrical projections 48 and 50 get in touch with the corresponding flanges of the reel buttons which are essential parts of the pressing member 32 and 34. Reference numerals 52a and 52b are engagement recesses which are formed in outer surfaces of an inner side wall of the main body 42, and reference numerals 54a and 54b are tacking projections which are formed on an inner surface of an outer side wall of the upper lid 44 to correspond to the engagement recesses.

When the cylindrical projections 48 and 50 which urge the pressing members 32 and 34 are provided on the upper lid 44 of the tape cassette storage container 40, and those cylindrical projections 48 and 50 are formed to be thick-walled, the projections 48 and 50 have strong mechanical strength, with the result that impact loading applied to the storage container 40 is liable to concentrate on the pressing members 32 and 34 through the cylindrical projections 48 and 50 when the storage container 40 is inadvertently dropped on e.g. a floor. This creates a new problem in that some components of the tape cassette, such as the reel buttons forming the pressing members 32 and 34, and a part of the transparent window 26 in the vicinity of the reel buttons, can be damaged. Such damage has a marked effect on the tape cassette 10 because it is for business purpose such as broadcasting. It can be proposed to make base portions of the cylinders forming the pressing projections solid to keep mechanical strength, and to form leading portions in a thin-wall hollow cylinder so as to decrease the mechanical strength in the leading portions as one of the measures to absorb impact loading. However, making the base portions of the pressing projections solid results in the top plate of the upper lid being thick-walled in those portions accordingly, causing a problem in that shrinkage is apt to occur in an outer surface of the top plate.

The present invention has been made, giving attention to the problems as stated earlier. It is an object of the present invention to provide a tape cassette storage container capable of preventing shaved or scraped powder from being produced to reel jars, a tape cassette from being damaged on dropping or the like, and avoiding the occurrence of shrinkage.

The foregoing and other object of the present invention have been attained by providing a tape cassette storage container comprising a main body and an upper lid, which are adapted to store a tape cassette including a pair of reels with a tape wound thereon, and pressing member urging the reels in a casing of combined upper and lower halves, the pressing member having top ends exposed outside from through holes formed in a window in an upper plate of the casing, wherein the upper lid includes a top plate which has an inner surface formed with pressing projections to urge the pressing members on closure. The pressing projections are made of inner thin-wall cylindrical projections, the top plate of the upper lid has the inner surface formed with outer thick-wall cylindrical projections to be around and close to the inner cylindrical projections, and the outer cylindrical projections are formed to have a shorter projection length than the inner cylindrical projections in such a manner to be out of contact with the window of the cassette casing.

It is preferable that the inner surface of the upper lid top plate has peripheral portions provided with cassette holding ribs to urge peripheral portions on an outer surface of the upper plate of the cassette casing on closure.

It is also preferable that the inner cylindrical projections include insertion preventing projections on the inner surface of the top plate therein to prevent the top ends of the pressing members from inserting into the inner cylindrical projections beyond a certain extent.

In accordance with the structure of the present invention, when a tape cassette is put in the main body of the storage container and the upper lid is closed for storage, the inner cylindrical projections which are formed on the inner surface of the top plate of the upper lid press down the top ends of the pressing members which are exposed outside from the through holes formed in the window of the cassette casing. In this manner, the reels are held against the bottom plate of the lower half in a good manner. As a result, the reels can be free from jarring even if vibration is applied during e.g. shipment. In addition, even if impact loading is applied to the storage container by e.g. dropping it inadvertently, an inner cylindrical projection which gets in touch with a pressing member of the tape cassette can be smashed to absorb the impact at the side of the storage container because the inner cylindrical projections are thin-walled. For these reasons, impact given to the pressing members from the inner cylindrical projections can be decreased. However, making the inner cylindrical projections thin-walled gives rise to weakness in mechanical strength. In order to cope with this problem, the outer cylindrical projections are made to be thick-walled to be used as stiffeners for the inner cylindrical projections. Further, the outer cylindrical projections are made to be have such a short projection length to be out of touch with the window of the cassette casing even if impact loading is applied. The wall thickness of the outer cylindrical projections is determined to such an extent that shrinkage does not occur in the inner surface of the top plate of the upper lid.

As explained, the present invention can press down the pressing members of the tape cassette by the inner cylindrical projections on the upper lid of the storage container to lock the reels. This construction permits preventing the reels from the jarring event if vibration is applied during e.g. shipment, and avoiding the occurrence of shaved or scraped powder, or an error in a signal or head clogging due to the powder. In addition, the thick-wall outer cylindrical projections can function as stiffeners for the thin-wall inner cylindrical projections to prevent shrinkage from occurring in the outer surface of the upper lid.

Further, even if impact loading is applied to the storage container by e.g. dropping it inadvertently, the inner cylindrical projections can be smashed to absorb the impact at the side of the storage container so as to decrease the impact given to the the pressing members from the inner cylindrical projections because the inner cylindrical projections are formed to be thin-walled. As a result, the storage container can work as a shock absorber to prevent the housed tape cassette from being damaged so as to accomplish a quality assurance function. Because the outer cylindrical projections are shorter than the inner cylindrical projections, the outer cylindrical projections can not get in touch with the window of the cassette casing even if impact loading is applied.

If the inner surface of the upper lid top plate has the peripheral portions provided with the cassette holding ribs to urge the peripheral portions on the outer surface of the upper plate of the cassette casing on closure, the holding ribs can urge the cassette casing at its peripheral portions which have a greater mechanical strength than the window. This arrangement allows preventing the tape cassette from jarring in the storage container and applying an impact load to the cassette casing in a dispersion manner. In addition, the inner cylindrical projections can be smashed to absorb the impact to further decrease the impact given to the pressing members from the inner cylindrical projections.

If the inner cylindrical projections include the insertion preventing projections on the inner surface of the top plate therein to prevent the top ends of the pressing members from inserting into the inner cylindrical projections beyond a certain extent, the presence of the insertion preventing projections can avoid the case wherein the pressing members have the top ends inserted into the inner cylindrical projections beyond a certain extent to be jammed therein even if the leading edge of either one of the holes in the inner cylindrical projections is expanded by inadvertently pushing a portion of the storage container in the vicinity of the formation of a pressing projection by a hand from outside to press the top end of a pressing member at the leading edge of the inner cylindrical projection during handling the tape cassette. This arrangement can avoid such a trouble that the tape cassette is adhered to the upper lid of the storage container to get difficult to be separated.

A more complete appreciation of the invention and many of the attendant advantages thereof will be readily obtained as the same becomes better understood by reference to the following detailed description when considered in connection with the accompanying drawings, wherein.

Now, embodiments of the present invention will be described in reference to the accompanying drawings.

Figure 1:
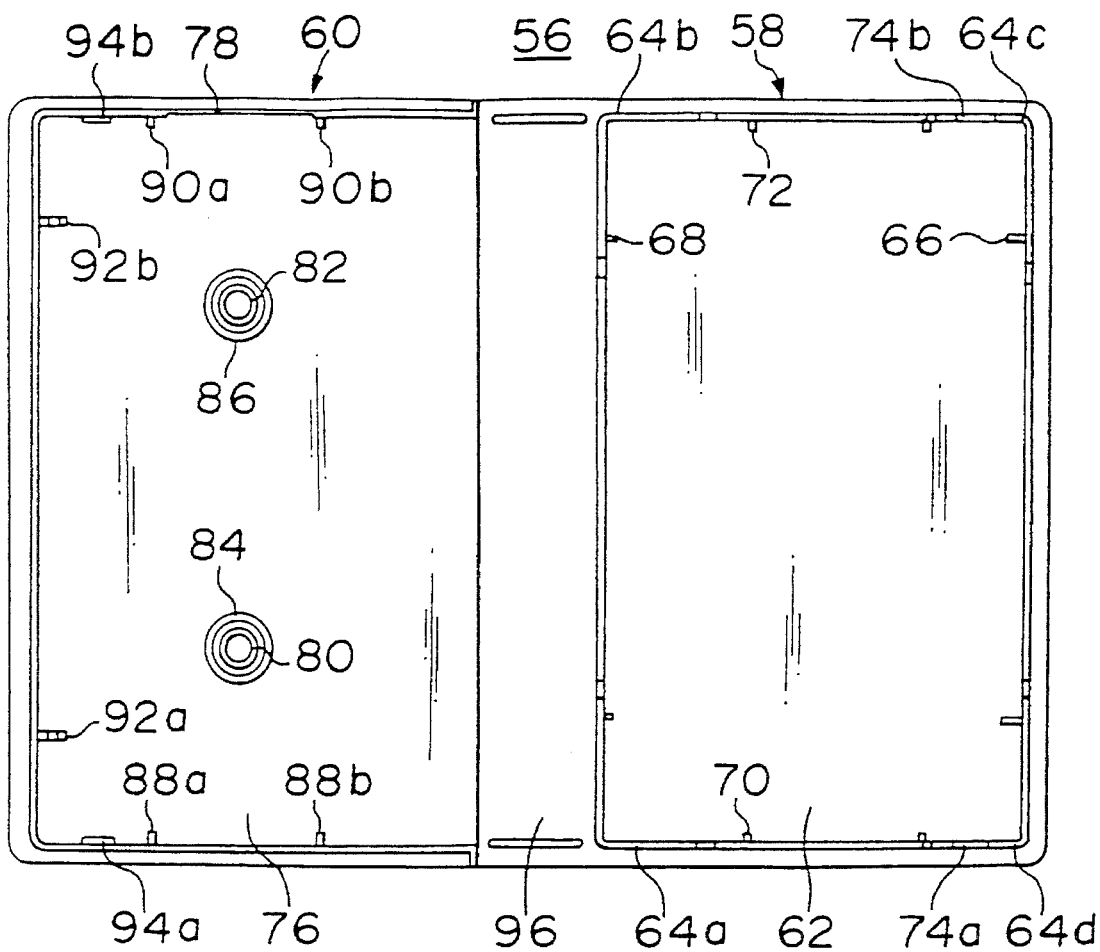
FIG. 1 is a plan view showing the video tape cassette storage container according to an embodiment of the present invention which is in its fully opened position.
Figure 2:
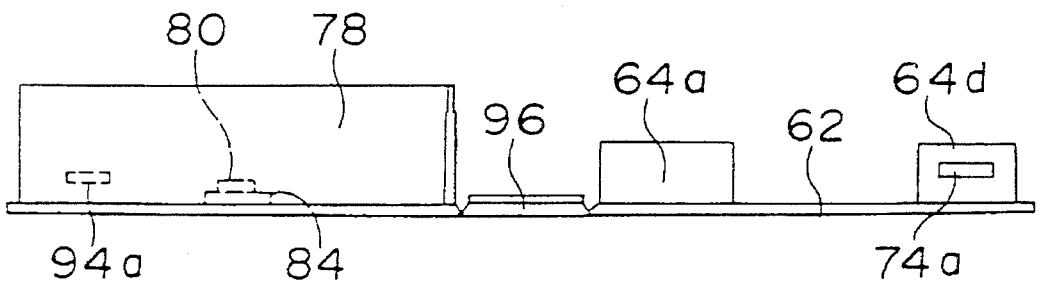
FIG. 2 is a left side elevation showing the video tape cassette storage container in its fully opened position.

FIG. 1 is a plan view showing a video tape cassette storage container in accordance with the present invention, which is in its fully opened position. FIG. 2 is a left side elevation of it. In those Figures, reference numeral 56 designates the video tape cassette storage container as a whole, which has a window made to be transparent and the other portions made to be translucent. Reference numeral 58 designates a main body of the storage container and reference numeral 60 designates an upper lid. The main body 58 comprises a rectangular lower plate 62, and inner side walls 64a, 64b, 64c and 64d formed on the corners thereof as if the side walls surround the lower plate on all sides. An inner surface of the lower plate 62 has peripheral portions on front and rear sides (right and left side portions in the Figures) formed with two pairs of cassette locating projections 66 and 68 to be symmetrically located in the right-to-left direction, and has peripheral portions on right and left sides (upper and lower side portions in the Figures) formed with two pairs of jar preventing projections 70 and 72 for the tape cassette in the main body 58 and the upper lid 60 to be symmetrically located in the front-to-rear direction. The inner side walls 64d and 64c have outer surfaces on the right and left side portions formed with central engagement recesses 74a and 74b respectively. The upper lid 60 comprises a rectangular top plate 76, and an outer continuous side wall 78 surrounding three sides thereof. The top plate 76 has an inner surface on central portion cylindrical projections 80 and 82 at locations which correspond to the top flanges of the pressing members 32 and 34 of the tape cassette 10 housed in the main body 58. The inner surfaces of the top plate has additional cylindrical projections 84 and 86 formed thereon to be close to and around the respective cylindrical projections 80 and 82. The inner cylindrical projections 80 and 82 are formed to be as thin as possible in terms of molding by use of fluidization of a molten resin. The outer cylindrical projections 84 and 86 have a wall thickness formed to be not less than twice that of the inner cylindrical projections 80 and 82.

The outer cylindrical projections 84 and 86 which are formed close to the corresponding inner cylindrical projections 80 and 82 so as to be thick-walled can function as stiffeners for the corresponding inner cylindrical projections 80 and 82 in order to cope with weakness in the mechanical strength which is caused by thinning the inner cylindrical projections. While the projection length of the inner cylindrical projections 80 and 82 is so long that the inner cylindrical projections get in touch with the top flanges of the corresponding pressing member 32 and 34, the projection length of the outer cylindrical projections 84 and 86 is shorter than, or not more than half that of the inner cylindrical projections so that the outer cylindrical projections are out of touch with the window 26 in the upper plate 24 of the tape cassette 10 even if an impact load is applied to flex the top plate 76 of the upper lid 60. For example, the inner cylindrical projections 80 and 82 have a wall thickness of 0.5 mm and a projection length of 4 mm, whereas the outer cylindrical projections 84 and 86 have a wall thickness of 1.0 mm and a projection length of 2 mm. In addition, the wall thickness of the outer cylindrical projections 84 and 86 is determined in such a manner to prevent shrinkage from occurring in an outer surface of the top plate 76 of the upper lid 60. The inner cylindrical projections 80 and 82 are located at the front side with respect to the central portion on the inner surface of the top plate 76.

The inner surface of the top plate 76 has peripheral portions on the right and left sides (the upper and lower side portions in FIG. 1) formed with two pairs of tape cassette holding projections 88a, 88b, 90a and 90b to be symmetrically located in the front to rear direction and to extend onto inner surfaces of the outer side wall 78 close to the respective peripheral portions, so that the cassette holding projections can urge at corresponding locations peripheral portions on an outer surface of the upper plate 24 of the tape cassette 10. The inner surface of the top plate 76 has peripheral portions on the front side (the left side portion in FIG. 1) formed with two cassette locating projections 92a and 92b to be symmetrically located in the right-to-left direction and to extend onto an inner surface of the side wall 78 close to the corresponding peripheral portions. Both corners of the side wall 78 have inner surfaces provided with tacking projections 94a and 94b to correspond to the engagement recesses 74a and 74b of the main body 58. The main body 58 and the upper lid 60 are connected through an elongated rectangular connection side wall 96 which is hingedly coupled to the lower plate 62 and the top plate 76. The cassette locating projections 66, 68, 92a and 92b, and the jarring preventing projections 70 and 72 for the tape cassette in the main body and the upper lid have been provided in the conventional storage container 40.

Figure 3:
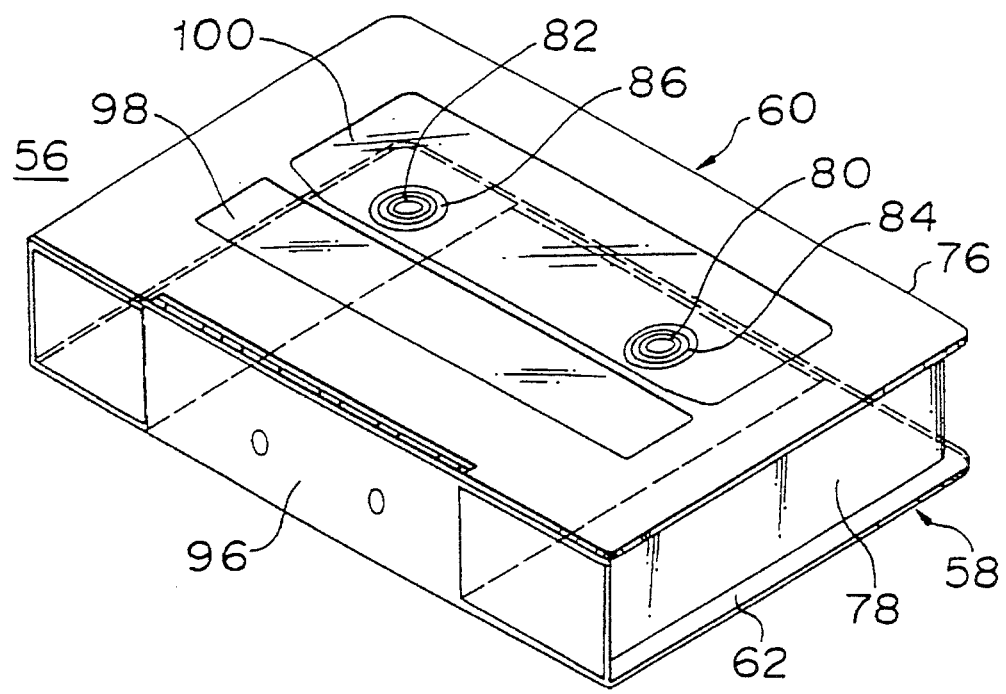
FIG. 3 is a perspective view showing the video tape cassette storage container in its fully closed position.

After the tape cassette 10 is put in the main body 58 of the storage container 56, the upper lid 60 is closed as shown in FIG. 3, and the projections 94a and 94b on the side wall 78 are engaged with the corresponding recesses 74a and 74b on the inner side walls 64d and 64c of the main body 58 to tack the lid 60 to the main body 58. At that time, the inner cylindrical projections 80 and 82 on the inner surface of the upper lid 60 press down the top flanges of the reel buttons of the pressing members 32 and 34 which are exposed outside from the through holes 36 and 38 in the upper half 14. As a result, the reels 20 and 22 are urged against the bottom plate of the lower half 16. Although the housed cassette tape 10 can be seen through e.g. rectangular windows 98 and 100 which are formed side by side in a central portion of the top plate 76 of the upper lid 60, the cassette tape is not shown in FIG. 3 for simplification.

Figure 4:
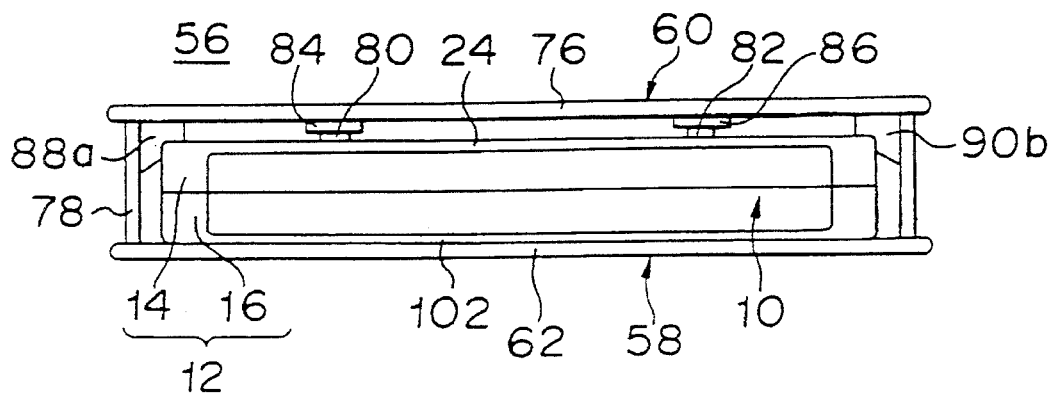
FIG. 4 is a front view of the video tape cassette storage container in its fully closed position in such a manner to see through the inside thereof.
Figure 5:
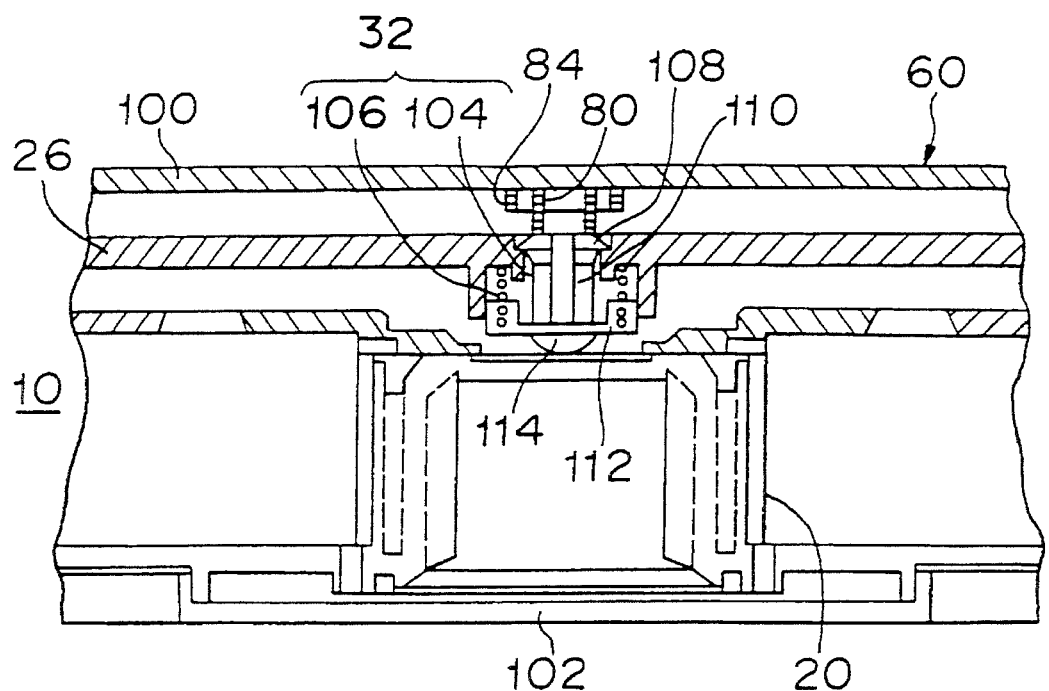
FIG. 5 is an expanded vertical sectional view showing in detail the vicinity of one of reel pressing members of a video tape cassette stored in the fully closed storage container.

FIG. 4 is a front view showing the closed container 56 with the tape cassette 10 housed therein in such a manner to see through the inside of the container, and FIG. 5 is an expanded vertical sectional view showing in detail one of the pressing members 32 and its vicinity. As explained, the inner surface of the top plate 76 of the upper lid 60 has peripheral portions provided with cassette holding ribs 88a, 88b, 90a and 90b to urge peripheral portions on the outer surface of the upper plate 24 of the cassette casing 12. The holding ribs 88a, 88b, 90a and 90b can urge the cassette casing 12 at its peripheral portions which have a greater mechanical strength than the window 26. This arrangement permits holding the tape cassette 10 against the lower plate 62 of the main body 58 in a good manner. As a result, the tape cassette 10 can be free from jarring in the storage container 56 even if vibration is applied during e.g. shipment. In addition, the inner cylindrical projections 80 and 82 can urge the corresponding pressing members 32 and 34 to hold the reels 20 and 22 against the bottom plate 102 of the lower half 16 in a good manner, thereby preventing the reels 20 and 22 from jarring even if vibration is applied. The pressing member 32 is constituted by a reel button 104 and a coiled spring 106. The reel button 104 is constituted by combining a quartered pillar member 110 with a truncated cone-shaped flange 108 on top, a dish-shaped base 112 for receiving the coiled spring 106 and a lower projection 114 as one unit. The other pressing member 34 has a similar structure.

In addition, even if an impact load is applied to the storage container 56 by e.g. dropping it inadvertently during handling the tape cassette 10, the impact load is given to the cassette casing 12 in a dispersion manner without concentrating on the locations of the inner cylindrical projections 80 and 82 because the storage container 56 has the upper lid 60 provided with the cassette holding projections 88a, 88b, 90a on 90b. Further, since the inner cylindrical projections 80 and 82 which get in touch with the pressing members 32 and 34 of the tape cassette 10 are made to be thin-walled, those projections 80 and 82 can be smashed to absorb the impact. As a result, the impact given to the pressing members 32 and 34 from the inner cylindrical projections 80 and 82 can be also decreased. In that manner, the tape cassette in the storage container 56 which stores important information can be protected even if the storage container 56 is damaged by e.g. dropping it.

Figure 6:
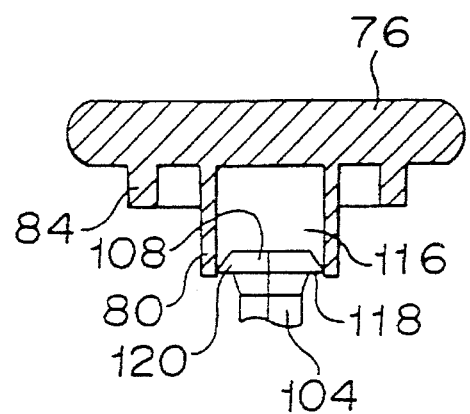
FIG. 6 is an expanded vertical sectional view explaining trouble which the top end of the a reel pressing member has when the fully closed video tape cassette storage container is made in an inadequate manner.

There is a case where after the tape cassette 10 has been put into the storage container 56, the storage container 56 is pressed outside on the vicinity of the formation of either one of the pressing projections by a hand. In such a case, the leading edge of the inner cylindrical projection 80 presses the top flange 108 on the reel button 104 in the corresponding pressing member 32. As a result, the mouth of a hole 116 in the leading edge of the inner cylindrical projection 80 is expanded as shown in FIG. 6, and the top flange 108 often snaps into the hole 116 to such an extent that the truncated cone-shaped top flange has a lower surface 118 gotten flush with the leading edge of the inner cylindrical projection. In this case, a circumferential edge 120 of the lower surface 118 is caught by the inner surface of the inner cylindrical projection 80 to get difficult to be pulled out, causing the upper lid 60 of the storage container 56 and the tape cassette 10 to be combined as if they were one unit. This creates a problem in that when the upper lid 60 is tried to be released, the tape cassette 10 is difficult to be separated due to adhesion to the upper lid 60. Because the top flange 108 is quartered, one or two parts snap into the hole 116 normally.

Figure 7:
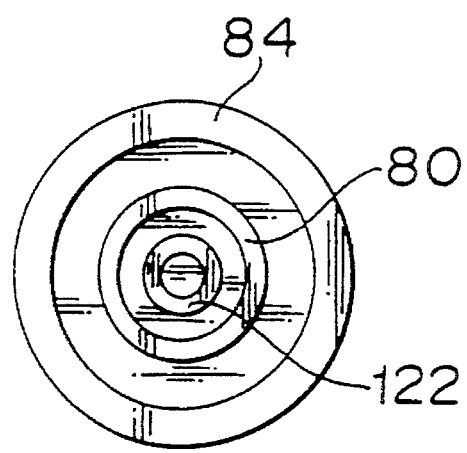
FIG. 7 is an expanded plan view showing one of inner cylindrical projections and its vicinity on an upper lid during opening the storage container, which has a cylindrical body formed therein as an insertion preventing projection to eliminate the trouble due to inadequate handling.
Figure 8:
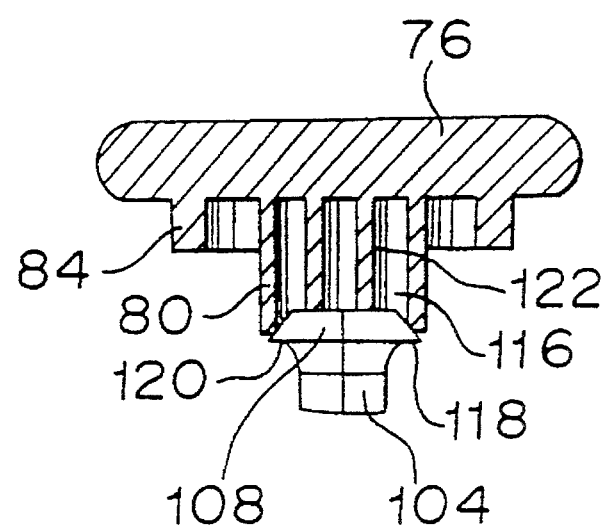
FIG. 8 is an expanded vertical sectional view explaining how the insertion preventing projection functions to the top end of the reel pressing member when the fully closed video tape cassette storage container is handled in an inadequate manner.

In order to cope with this problem, at least one of the inner cylindrical projection 80 may include a cylindrical inserting preventing projection 122 on the inner surface of the top plate 76 therein as shown in FIG. 7 to prevent the top flange 108 of the pressing member 32 from inserting into the inner cylindrical projection beyond a certain extent. By this arrangement, the presence of the inserting preventing projection 122 can prevent the top flange 108 from snapping into the hole up to the position of the lower surface 118 to be caught in the hole even if the mouth of the hole 116 in the leading edge of the inner cylindrical projection 80 is expanded due to hand pressure as shown in FIG. 8. It is preferable that the inserting preventing projection 122 has substantially the same wall thickness as the inner cylindrical projection 80. The inner diameter of the inserting preventing projection 122, the distance between the inner cylindrical projection 80 and inserting preventing projection 122, and so forth are determined to be small so that any one of the quartered parts in each top flange 108 can not snap into the corresponding hole up to the position of the circumferential edge 120 thereof.

Figure 9:
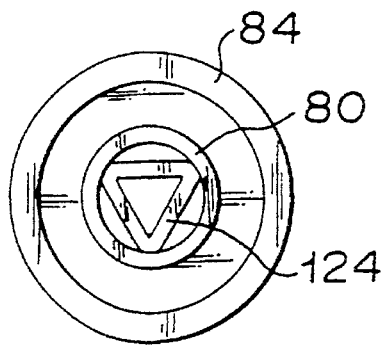
FIG. 9 is an expanded plan view showing one of the inner cylindrical projections and its vicinity on the lid during opening the storage container, which has a triangular shaped cylindrical body formed therein as the insertion preventing projection.
Figure 10:
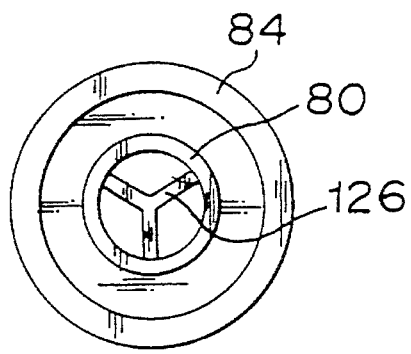
FIG. 10 is an expanded plan view showing one of the inner cylindrical projections and its vicinity on the upper lid during opening the storage container, which has a pillar shaped body formed therein as the insertion preventing projection to have extensions projecting in three directions.
Figure 11:
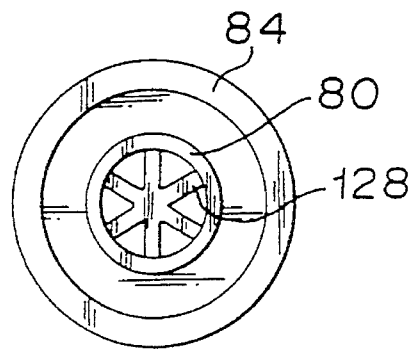
FIG. 11 is an expanded plan view showing one of the inner cylindrical projections and its vicinity on the upper lid during opening the storage container, which has a pillar shaped body formed therein as the insertion preventing projection to have extensions projecting in six directions.
Figure 12:
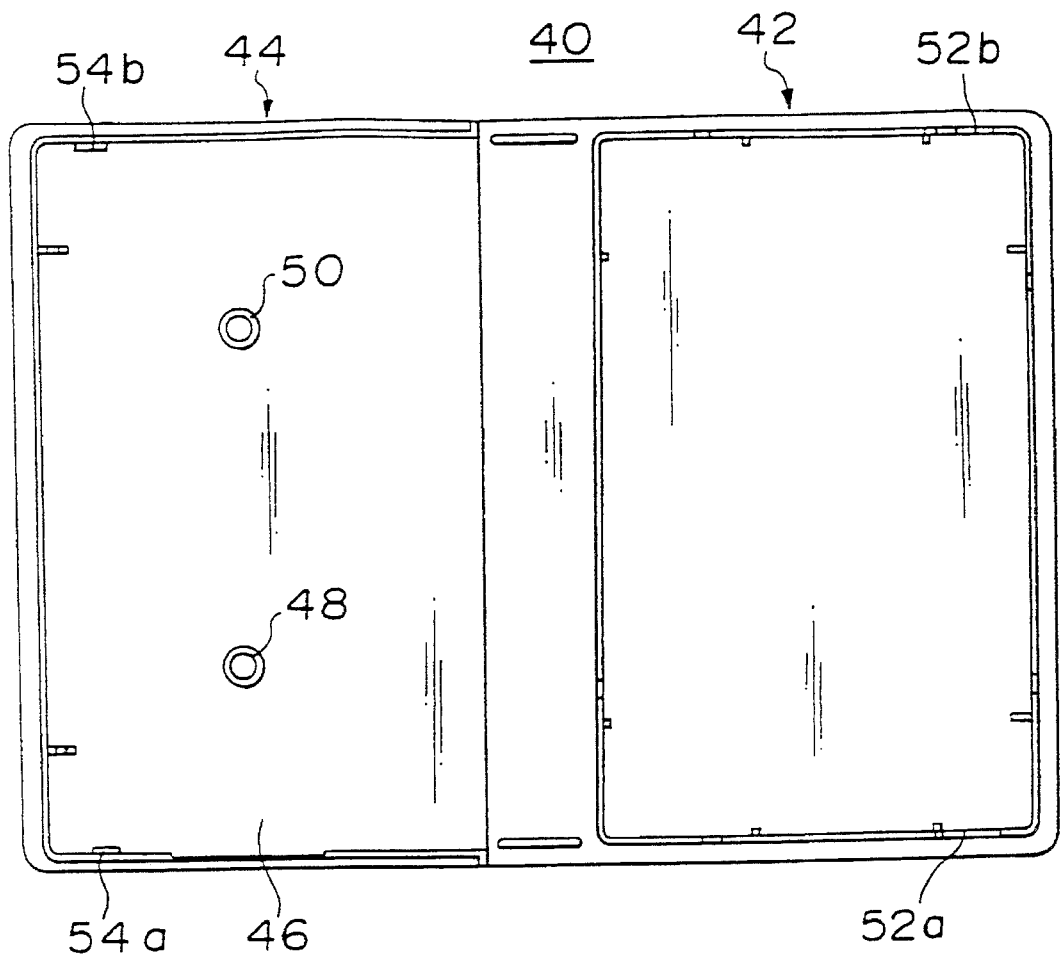
FIG. 12 is a plan view showing a conventional video tape cassette storage container in its fully opened position.
Figure 13:
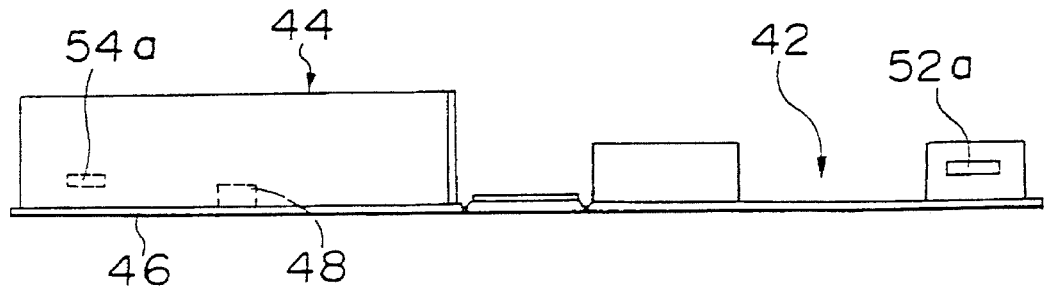
FIG. 13 is a left side elevation showing the conventional video tape cassette storage container in its fully opened position.
Figure 14:
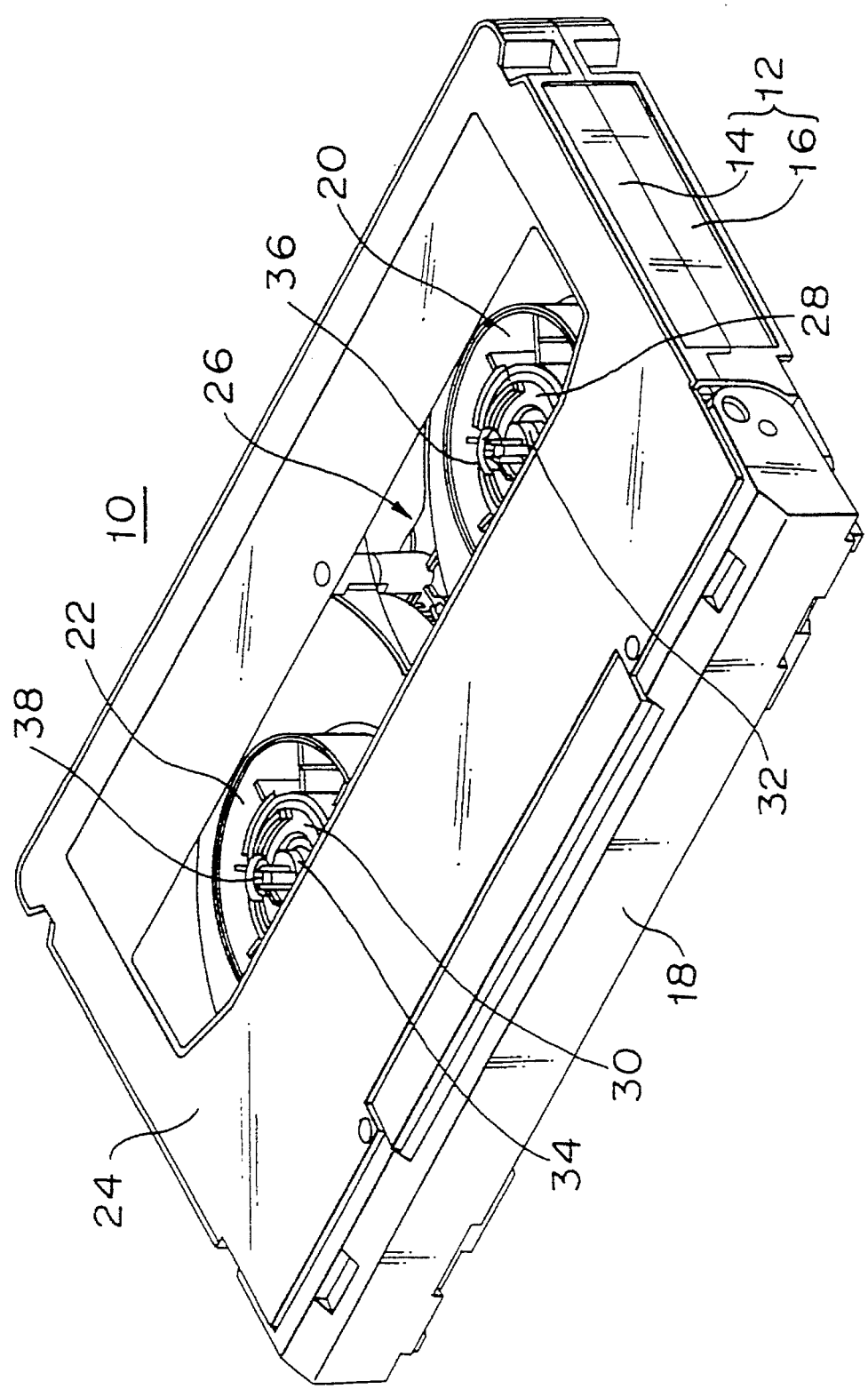
FIG. 14 is a perspective view showing a video tape cassette which has portions of reel pressing members exposed outside.

Although, the inserting preventing projection is cylindrical in the embodiment stated earlier, the insertion preventing projection can have its shape modified to be an element 124 having a triangle cross section as shown in FIG. 9, to be a pillar member 126 having extensions projecting in three directions as shown in FIG. 10, or to be a pillar member 128 having extensions projecting in six directions as shown in FIG. 11.

We claim:

1. A cassette storage container for storing a tape cassette including a casing formed of combined upper and lower halves, the casing having a window including through holes, a pair of reels with a tape wound thereon, and pressing members urging the reels, the pressing members having ends exposed to the outside via the through holes, said container comprising:

a main body;

an upper lid cooperable with said main body to close the main body; and pressing projections mounted to an inner wall of a top plate of said upper lid at such positions that said pressing projections press on pressing members of a said cassette contained therein when said upper lid closes said main body, wherein said pressing projections each comprise a thin walled cylindrical projection; and thick walled cylindrical projections mounted to the inner wall of said upper lid at positions sufficiently closely surrounding said pressing projections that said thick walled cylindrical projections can function as stiffeners for the pressing projections surrounded thereby, wherein said thick walled cylindrical projections each have a length shorter than that of said pressing projections and less than a spacing between said inner wall of said upper lid and a said casing window when said upper lid closes said main body with a said cassette contained therein so that said thick walled cylindrical projections do not contact a said casing window when said upper lid closes said main body with a said cassette contained therein.

2. A tape cassette storage container according to claim 1 wherein the inner surface of the upper lid top plate has peripheral portions provided with cassette holding ribs to urge peripheral portions on an outer surface of an upper plate of a cassette on closure.

3. A tape cassette storage container according to claim 2 wherein at least one of the pressing projections includes an insertion preventing projection therein to prevent top end of said pressing member from inserting into the inner cylindrical projection beyond a certain extent.

4. A tape cassette storage container according to claim 1 wherein at least one of the pressing projections includes an insertion preventing projection therein to prevent top end of a said pressing member from inserting into the inner cylindrical projection beyond a certain extent.

* * * * *